March 27, 1951     J. F. O'CONNOR     2,546,472
DRAG AND DISK TRAILER

Filed Jan. 2, 1948     3 Sheets-Sheet 1

Joseph F. O'Connor
INVENTOR.

BY *Clarence A. O'Brien
and Harvey B. Jacobson*
Attorneys

March 27, 1951  J. F. O'CONNOR  2,546,472
DRAG AND DISK TRAILER
Filed Jan. 2, 1948  3 Sheets-Sheet 2

Joseph F. O'Connor
INVENTOR.

March 27, 1951     J. F. O'CONNOR     2,546,472
DRAG AND DISK TRAILER
Filed Jan. 2, 1948     3 Sheets-Sheet 3
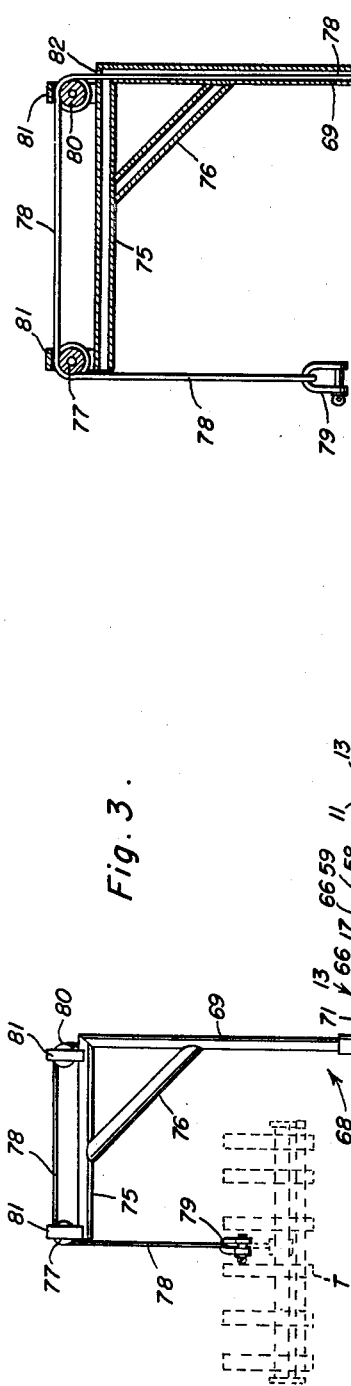
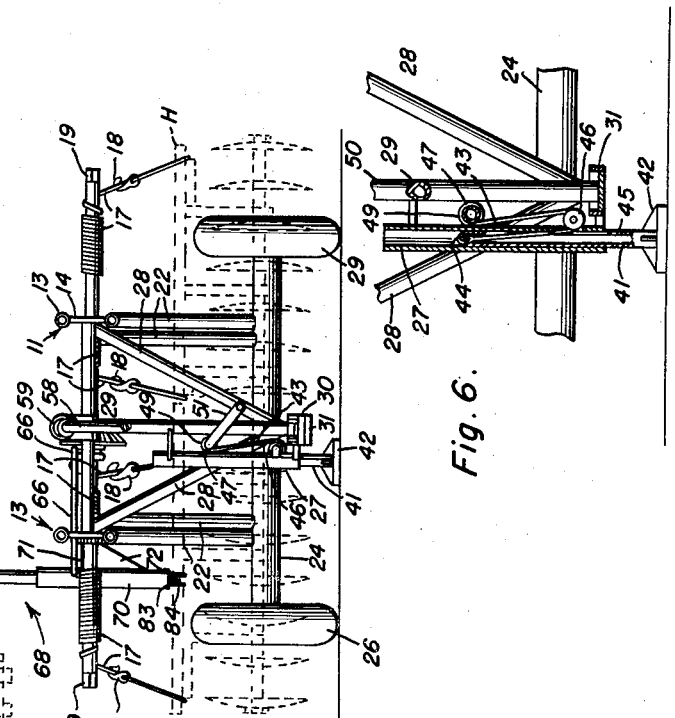
Joseph F. O'Connor
INVENTOR.

Patented Mar. 27, 1951

2,546,472

UNITED STATES PATENT OFFICE 2,546,472

DRAG AND DISK TRAILER

Joseph F. O'Connor, Milan, Ohio

Application January 2, 1948, Serial No. 271

2 Claims. (Cl. 214—75)

This invention relates to a trailer for raising and transporting agricultural implements along a road or from one place to another on a farm, and more particularly, for hauling a drag or toothed cultivator, a disk harrow or other implements which cannot be dragged or wheeled along without damage or injury to roads and also for carrying a culipacker or earth roller while the trailer is coupled to and drawn by a tractor.

Another object of the invention is to provide a trailer for raising and transporting a drag or disk harrow, which can be readily coupled to the tractor draw bar by means of a hitch, by one man and provided with windlasses for attaching to a disk harrow and means for driving the windlasses manually or by power from the power take-off of the tractor, to raise the disks clear of the ground for transportation from one place to another, and with a derrick or crane having a swinging jib or boom by which a drag or toothed harrow or cultivator may be raised and mounted upon the wheeled frame of the trailer to be similarly transported, in addition to transporting other implements such as a culipacker or bar roller.

Another object of the invention is to provide a novel construction of wheeled trailer having means for raising and lowering the tractor hitch thereof to be coupled to the draw bar of the tractor by one man, in the form of a stand adapted to be raised to permit the trailer to travel on its wheels in connection with the tractor hitch or to be lowered, for raising the hitch to couple the same to the drawbar of the tractor and having means designed to be driven from the power take-off of the tractor for operating the windlasses or raising and lowering means which permits the harrow or wheeled disk cultivator and drag or tooth harrow to be raised from the ground or to be lowered for use.

Another object of the invention is to provide a simple and economical trailer construction which is supported by the tractor where it hitches to the draw bar thereof at the front, and supported by pneumatic tires at the rear, and provided with means whereby one man may pick up a four-section drag and double disc harrow with a minimum of effort, and to transport the same from one place to another on a farm or along roads, and also transport other implements in a convenient and expeditious manner and avoid damage to roads and property.

Other objects and advantages reside in the details of construction and operation as more fully hereinafter described and claimed, reference being had to the accompanying drawings forming part hereof, wherein like numerals refer to like parts throughout, and in which:

Figure 3 is a transverse sectional view taken on the line 3—3 of Figure 1.

Figure 5 is a transverse vertical sectional view taken on the line 5—5 of Figure 1.

Figure 6 is a detailed fragmentary transverse sectional view taken on the line 6—6 of Figure 2, and Figure 7 is an enlarged transverse vertical sectional view taken on the line 7—7 of Figure 4.

Figure 1:
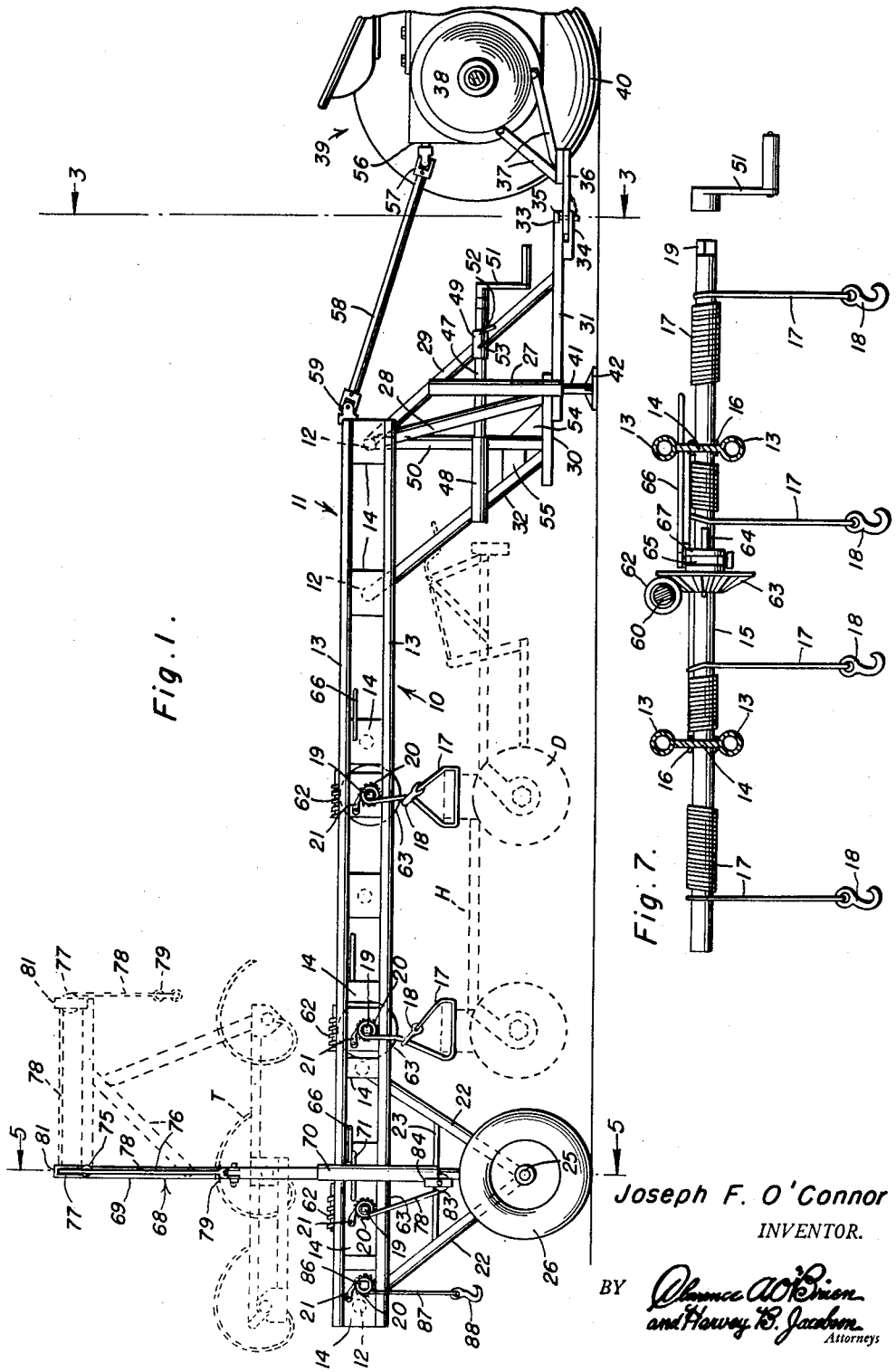
Figure 1 is a side elevation of a trailer constructed in accordance with the invention.
Figure 2:
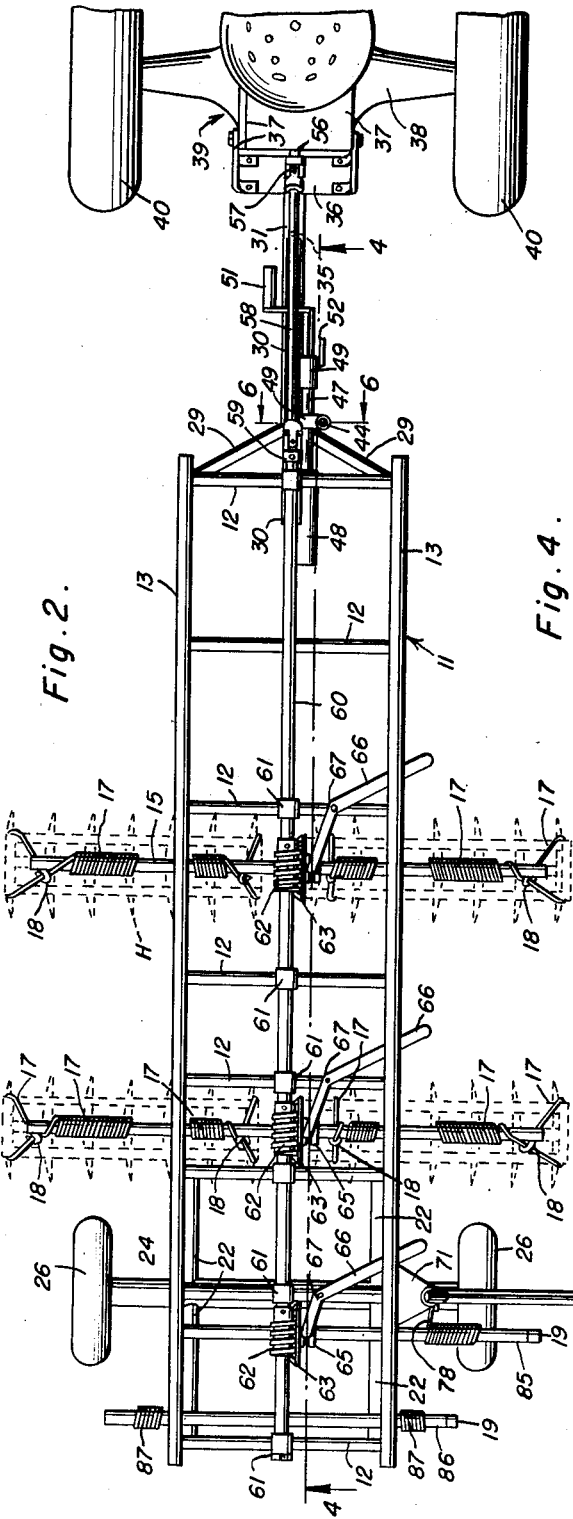
Figure 2 is a top plan view of the trailer.
Figure 4:
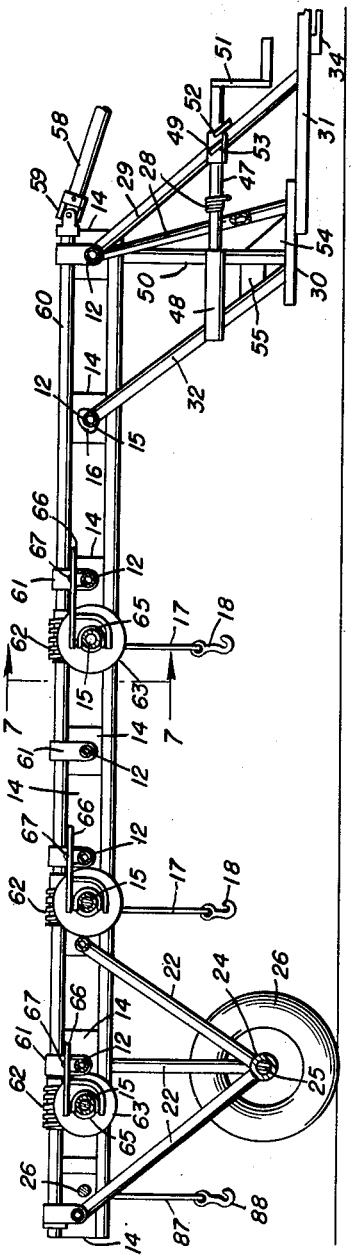
Figure 4 is a longitudinal sectional view taken on the line 4—4 of Figure 2.

Referring to the drawings in detail, the trailer of the present invention is shown as comprising a wheeled frame 10, including parallel longitudinal frame members 11 approximately fifteen and a half feet in length or otherwise and connected by transverse reinforcing and connecting bars 12 to a width of about three feet and a half or otherwise and about three and a half feet off of the ground. The longitudinal frame members or bars 11 are shown made up of upper and lower tubular members or channels 13 connected by vertical reinforcing plates or webs 14 at suitable intervals, welded to the members 13 and between which the transverse tubular and horizontal reinforcing or connecting bars 12 extend and are fastened at their extremities. At other intervals, in lieu of the transverse members 12, and between the same, windlasses are supported including transverse horizontal shafts 15 journalled in bearings 16 in certain of the plates 14 of the longitudinal members 11 and projecting out from the sides thereof a considerable distance as well as spaced apart in parallel relation longitudinally of the frame the distance between the disks of the double disk harrow represented in dotted lines at H, the disks of which are represented at D. These shafts form windlasses in connection with ropes or cables 17 which are attached to the shafts which may be tubular or otherwise, and are provided with hooks or other devices 18 at their extremities by which the cables 17 may be looped around the frame of the harrow as indicated in the drawings, and the hooks 18 engaged with the depending ends of the cables to support the harrow and to raise and lower the same with respect to the ground. As shown, four of such cables or lifting devices are mounted along the lengths of the shafts 15 and each is provided with a squared end 19 for the application of a crank for turning the same manually if desired. Also, each shaft is provided with a ratchet wheel 20 adapted to be engaged by a dog or pawl 21 for holding the shafts when turned, to support the harrow in an elevated position clear and off of the ground.

In order to support the trailer, oppositely inclined and vertical braces 22 connected by a cross-brace 23 are arranged near the rear ends of the frame members 11, supporting an axle housing 24 at their lower ends, on the spindle ends of the axle 25 of which suitable transporting wheels indicated as pneumatic tired wheels 26 are journalled.

At the front, a stand 27 is provided vertically, the same being connected to inclined braces 28 and 29, the former extending outwardly in inclined positions or diverging downwardly from the side members 11 to a horizontal bar 30 at the bottom and the latter or inclined brace 29 extending from the cross-member 12 centrally to a tractor hitch bar 31 connected to the bar 30 and a rearwardly extending forwardly inclined brace 32 connected to the cross-member 12 in rear thereof. The hitch bar 31 extends forwardly in a horizontal position and is provided with upper and lower apertured hitch members 33 and 34 designed to take a pin 35 for attaching or coupling the same to the tractor draw bar 36 suitably supported as indicated at 37 from the rear axle housing 38 of the tractor 39 having the usual tractor wheels 40. The stand 27 as shown in Figures 1 and 6, includes an upper section connected to the braces 28 and 29 and the hitch bar 31 at its lower end, and having telescoping therein by reason of the tubular construction of the stand section 27, a lower tubular section 41 having a supporting foot 42 to rest on the ground without penetrating the same. A cable 43 is connected to the upper end of the movable section 41 as indicated at 44 and extends downwardly through said section 41 and through a slot 45 in one side thereof at the inside where it passes under a pulley 46 after passing through an opening in the stand section 27 and then upwardly over a tubular or windlass shaft 47 supported in bearing sleeves 48 and 49 horizontally supported in the braces 32 and a vertical brace 50 and at the brace 29 respectively. The forward end of the horizontal shaft 47 which also may be tubular, is designed for the application of a hand crank 51 whereby it may be turned in one direction to wind the cable 43 on the windlass shaft 47 to lower the section 41 of the stand in supporting position, or to raise the same from engagement with the ground by turning the windlass in the opposite direction, in either position of which it may be held by means of a set screw 52 engaged through the bearing sleeve 49 and with the shaft 47. Incidentally, the bearing sleeve 49 may be reinforced by webs or plates 53 at opposite sides in connection with the brace 29. The foot 42 is designed to be raised off of the ground when transporting the harrow or to be lowered, to support the trailer which is uncoupled from the tractor for coupling the latter to the harrow when the latter is lowered to the ground and detached from the trailer at the windlasses or cables 17 by detaching the hooks 18 after the trailer has been lowered by the windlasses as will be readily apparent. Also, in addition to the gusset plates 53, the bar 30 and braces 32 and 50 may be reinforced by gusset plates or webs 54 and 55 welded in position. In addition to manually turning the shafts 15 by means of hand cranks such as the hand crank 51 which may be applied to the squared ends of the shafts 15, the latter may be driven by power from the power take-off of the tractor indicated at 56 by a universal coupling 57 connecting the power take-off shaft to an inclined shaft 58 and by a universal joint 59 connected to a longitudinally extending driven shaft 60 journalled in bearings 61 supported by the cross-members 12, or otherwise suitably connected to the power take-off with a spring clutch or otherwise as a safety element. The shaft 60 is suitably operatively connected to the shafts 15 as by means of suitable gears indicated in the form of worms at 62 engaging worm gears 63 on the shafts 15 to wind the cables 17 on the windlass shafts 15 to raise and lower the harrow by power. In order to operatively connect the shafts 15 with the shaft 60, the worm gears or pinions 63 are slidably mounted or keyed on the shafts 15 as indicated at 64 and carried by grooved collars 65 adapted to be slid back and forth on the splines or keys of the shafts 15 by means of levers 66 having forks connected to the grooved collars 65 and pivoted as at 67 on the frame 10 as to the cross-members 12, the levers extending between the plates 14 of the side members 11 so as to operate the shafts 15 independently or simultaneously by shifting the respective worm gears or pinions 63 into connection with the gears or worms 62 on the shaft 60.

At the rear of the trailer, a crane or derrick 68 is provided, the same having a vertical mast 69 rotatable in a sleeve bearing 70 and extending vertically and reinforced to the side members of the frame by webs or gusset plates 71 and 72 as shown more particularly in Figure 5 of the drawings, and offset outwardly approximately six inches from the side members 11 at one side of the frame 10. The mast 69 is adapted to turn or swing in an arc of three hundred sixty degrees, that is a complete circle, and held from dropping by a suitable support, rib or collar 73 at the bottom and may be provided with an additional collar 74 at the top to rest on the upper end of the sleeve 70 and turned thereon. The mast is provided with a swingable jib or boom 75 in the form of an arm extending horizontally and braced to the mast as indicated at 76. The free end of the jib or boom 75 carries a pulley 77 over which a cable 78 is trained, said cable carrying at its depending free end, a clevis or hook or other similar device 79 for attaching the same to a drag or toothed harrow indicated generally at T by dotted lines in Figure 1 of the drawings. The cable then extends inwardly over the top of the jib or boom 75 and around a pulley 80 supported on said end, suitable bearings or brackets 81 being provided at the inner and outer ends of the boom to support the pulleys 77 and 80. The cable 78 then extends downwardly through an opening 82 at the inner end of the jib or boom 75 and upper end of the mast 69, and downwardly through the latter and under a guide pulley 83 supported in a bearing bracket 84 at the lower end of the mast and sleeve, after which it is extended upwardly and rearwardly to wind around the single projecting end of a shaft 85 also journalled in the side members 11 of the frame 10 at corresponding longer or shorter plates 14 near the rear end of the same. This shaft is provided with similar turning or winding means for the windlasses and pawl and ratchet mechanism as heretofore described in connection with the shafts 15, and gear shifting means, for operatively connecting the shaft 85 to the shaft 60 the same as in connection with the shafts 15, and similarly numbered.

Also provided at the rear end of the frame is a corresponding mounted transverse shaft 86, which like the shafts 15 and 85, is mounted in corresponding bearings in the frame members 11 and provided with squared ends to take a crank as at 19 or 51 for manually turning the same, except that the shaft 86 is not shown driven by the shaft 60 which has its rear bearing on the rear cross-member 12. However, the ends of the shaft 86 both project for taking cables 87 to form windlasses, and provided with hooks 88, to lift any other suitable farm implement such as a culipacker or bar roller and carry the same along on the trailer with the drag and disk harrow.

In the operation of the device, the hook, clevis or other connection 79 is attached to the toothed cultivator C and the windlass or shaft 85 is turned to wind the cable 78 thereon, while the jib or boom 75 is projecting outwardly as shown in the drawing to raise the drag T, until the drag or harrow is at the proper height above the frame 10, after which the jib or boom is swung inwardly over the frame of the trailer and the shaft 85 turned in the reverse direction to lower the drag or harrow upon the frame. The trailer is then pulled over the double disk harrow H and the stand 27 lowered to support the trailer. The shafts 15 are manually operated or power driven from the tractor through the medium of the shafts 56, 58 and 60 to wind the cables 17 of the windlasses upon the shafts 15 after the cables are engaged with the frame of the harrow in the manner shown in Figure 1 of the drawings with the hooks 18 looped around the harrow frame and engaged with the cables below the shafts. By rotating the shafts and windlasses, the harrow is raised above the ground. Of course, it is to be understood that the trailer is coupled to the draw bar of the tractor by raising the front end of the trailer through the medium of the crank 51 by lowering the section 41 of the stand 27. Then, when the trailer has been coupled and the harrow and drag raised in the manner described for support upon and suspension from the frame of the trailer, they may be transported around the farm or over roads to the place where it is desired to use same, without damage to property or injury to the roads. One man can couple the trailer to the tractor and also operate the device to raise a four-section or other sized drag or toothed cultivator and a double disk harrow with a minimum of effort so that the same can be transported from place to place and lowered for use, at which time, the trailer is uncoupled from the tractor and the latter used for operating the instruments over the soil.

While in the foregoing there has been shown and described the preferred embodiment of this invention it is to be understood that minor changes in the details of construction, combination and arrangement of parts may be resorted to without departing from the spirit and scope of the invention as claimed.

Having described the invention what is claimed as new is:

1. A trailer of the class described comprising a wheeled frame including parallel side members comprising upper and lower bars and plates connecting the same, cross members between said side members, a vertical stand at the front of the frame having a telescoping lower section and a stationary upper section, braces between the frame and said stand, a hitch bar extending forwardly from said braces and stand and adapted to be coupled to the draw bar of a tractor, means mounted on said braces for raising and lowering the lower section and including a cable movable in the upper stationary section and attached to the upper end of the movable section, means to hold said stand in adjusted position when said telescoping section is lowered to support the trailer at the front or raised, when coupled to the tractor, windlasses horizontally journalled across the plates of the side members of the frame and having cables thereon to depend therefrom for engagement with the frame of a harrow straddled by the trailer, a swingable boom mounted in the rear thereof at one side outwardly and having a cable and a windlass operating the same, said cable being movable over the boom and through the mast thereof, said shafts adapted to be turned at the side by means of cranks and provided with pawl and ratchet mechanisms to hold the same in adjusted positions of rotation, a power take-off shaft driven from the power take-off of the tractor and journalled horizontally across the cross members of the frame and having operative gear connections with the shafts of the windlasses, means for operatively connecting and disconnecting said shafts, to simultaneously or independently drive the same.

2. A trailer of the class described comprising an elongated horizontal frame having side members and cross members connecting the same, said side members comprising upper tubular members and plates between the same and connected thereto, said cross members being connected to the plates, bearings on certain of said cross members, windlasses having transverse shafts journalled across the frame in said bearings and plates and projecting outwardly from the sides thereof, cables on said projecting ends of the shafts having hooks at the free ends thereof, means for turning said shafts independently, ratchet means for holding said shafts against rotation, and adapted when the hooks and cables are engaged with the frame of a harrow to raise said harrow beneath the frame, a wheeled carriage at the rear of the frame having braces connected to said side members, braces extending beneath the front of the frame, a stand carried by said latter braces and including an upper stationary section secured to the braces and a lower movable telescopic section having a ground engaging foot, a cable connected to the upper end of the movable section within the stationary section and extending downwardly therethrough and through the stationary section, a pulley positioned in the stationary section adjacent to the point where the cable extends through the same, the lower portion of the movable section having a slot movable over the cable, a shaft horizontally mounted in longitudinal position on said braces across the stand and having a windlass for engagement by said cable to wind thereon, means for turning said shaft, means for holding said shaft in adjusted position to lower the movable section of the stand to hold the front of the trailer raised.

JOSEPH F. O'CONNOR.

REFERENCES CITED

The following references are of record in the file of this patent:

UNITED STATES PATENTS

| Number | Name | Date |
| --- | --- | --- |
| 1,097,806 | Lass | May 26, 1914 |
| 1,786,060 | Greaves et al. | Dec. 23, 1930 |
| 1,891,517 | Williams | Dec. 20, 1932 |
| 2,240,564 | Le Tourneau | May 6, 1941 |
| 2,387,568 | Drott et al. | Oct. 23, 1945 |
| 2,404,898 | Aycock | July 30, 1946 |
| 2,442,273 | Lofshult | May 25, 1948 |
| 2,448,119 | Peterson | Aug. 31, 1948 |
| 2,448,443 | Krake | Aug. 31, 1948 |
| 2,454,675 | Showalter | Nov. 23, 1948 |